United States Patent [19]

Richardson, Jr.

[11] Patent Number: 4,934,905
[45] Date of Patent: Jun. 19, 1990

[54] OIL TURBULENCE MINIMIZER FOR A HERMETIC COMPRESSOR

[75] Inventor: Hubert Richardson, Jr., Brooklyn, Mich.

[73] Assignee: Tecumseh Products Company, Tecumseh, Mich.

[21] Appl. No.: 345,076

[22] Filed: Apr. 28, 1989

[51] Int. Cl.⁵ ............................................. F04B 39/02
[52] U.S. Cl. ..................................... 417/372; 417/902
[58] Field of Search ................................ 417/372, 902

[56] References Cited

U.S. PATENT DOCUMENTS

| | | |
|---|---|---|
| 2,883,101 | 4/1959 | Kosfeld . |
| 2,905,510 | 9/1959 | Gardiner . |
| 3,434,056 | 3/1969 | Bellmer . |
| 3,618,337 | 11/1971 | Mount . |
| 3,653,248 | 4/1972 | Leffers . |
| 3,664,461 | 5/1972 | Leffers et al. . |
| 4,496,293 | 1/1985 | Nakamura et al. . |
| 4,545,743 | 10/1985 | Earley . |
| 4,585,403 | 4/1986 | Inaba et al. . |
| 4,621,993 | 10/1986 | Nakamura et al. . |
| 4,637,786 | 1/1987 | Matoba et al. . |
| 4,666,381 | 5/1987 | Butterworth . |
| 4,762,471 | 8/1988 | Asamuma et al. ............... 417/902 X |
| 4,781,542 | 11/1988 | Ozu et al. ......................... 417/902 X |
| 4,846,635 | 7/1989 | Fry et al. .......................... 417/902 X |

Primary Examiner—John C. Fox
Attorney, Agent, or Firm—Jeffers, Hoffman & Niewyk

[57] ABSTRACT

A hermetic compressor assembly is disclosed including a motor-compressor unit disposed within a hermetically sealed housing, wherein the housing has an oil sump in the bottom thereof from which oil is drawn to lubricate the compressor mechanism. An electric drive motor includes a vertical rotor having a lower axial end adjacent the oil sump. An arc-shaped counterbalance weight and an annular plate member having a smooth bottom surface adjacent the oil sump are connected to the lower axial end of the rotor, whereby upon rotation of the rotor turbulence and resulting agitation of the oil in the oil sump are prevented. In one embodiment, the counterbalance weight and plate member are integrally formed. In other embodiments, the weight is disposed intermediate the rotor and a flat or dish-shaped plate member, which presents a smooth bottom surface adjacent the oil sump.

20 Claims, 2 Drawing Sheets

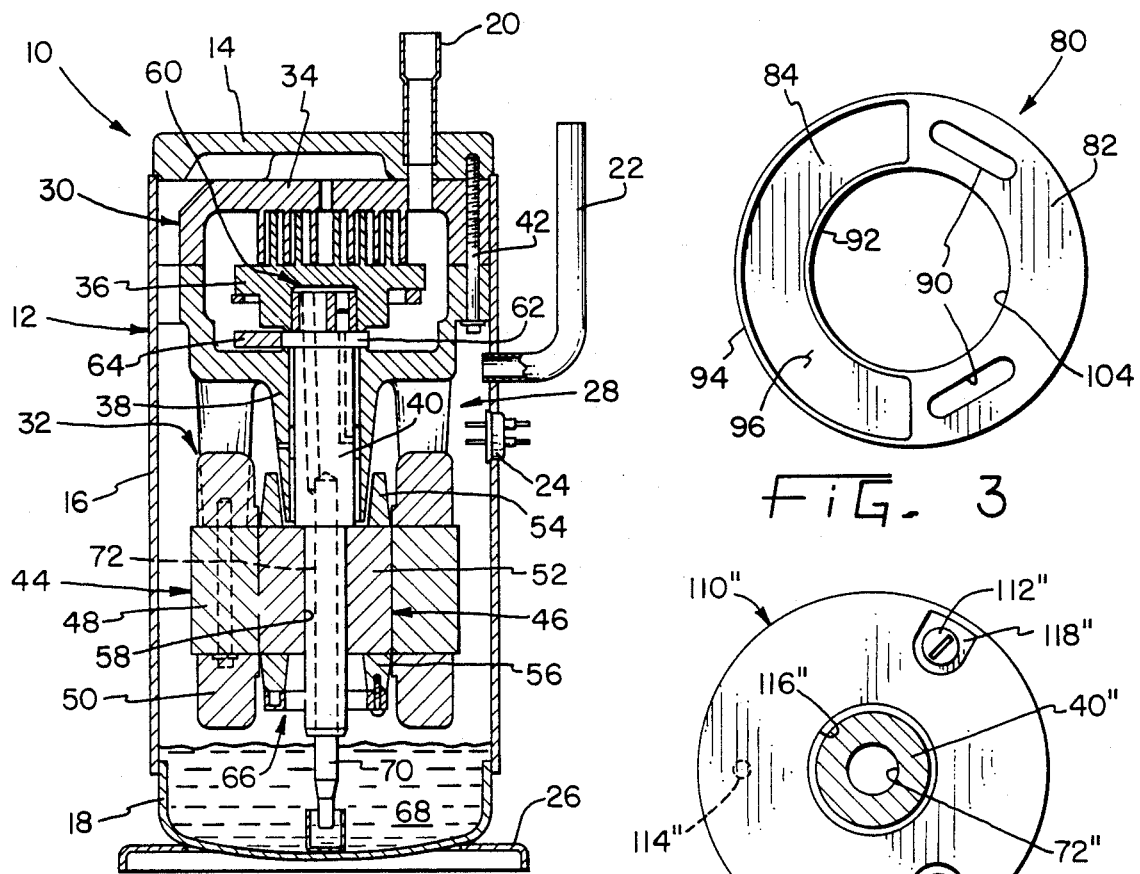
FIG. 3
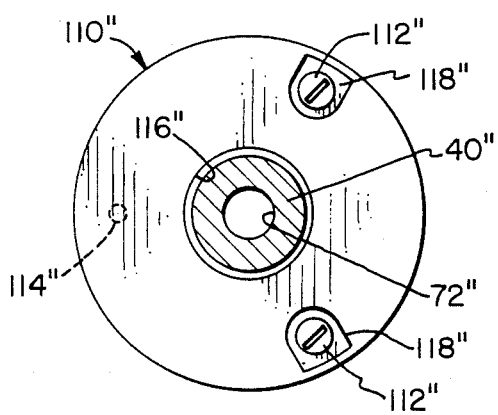
FIG. 6
FIG. 1
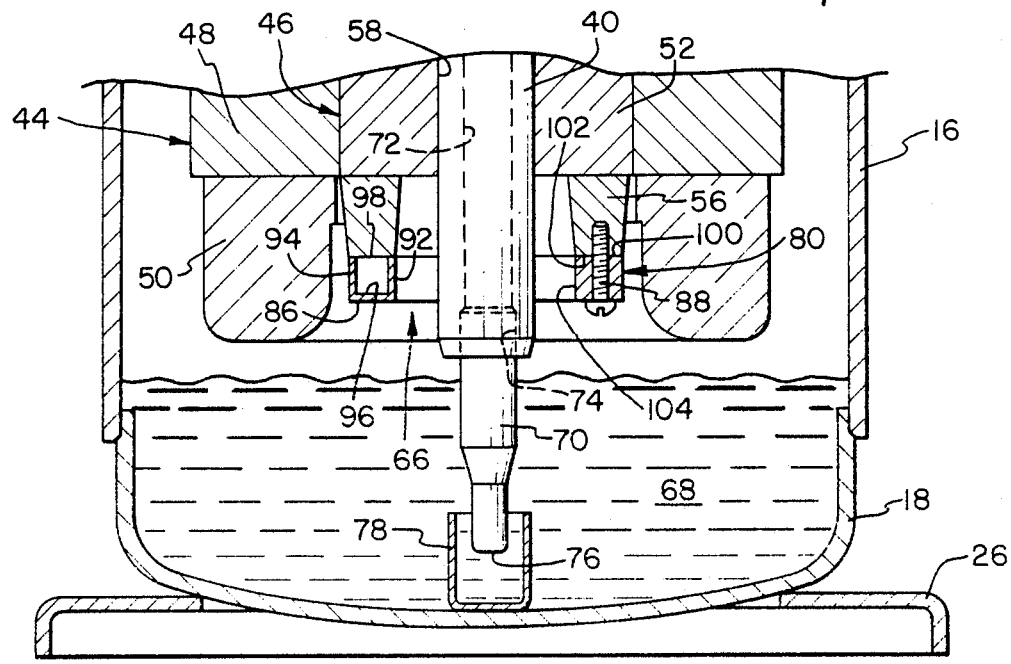
FIG. 2

OIL TURBULENCE MINIMIZER FOR A HERMETIC COMPRESSOR

BACKGROUND OF THE INVENTION

The present invention relates generally to hermetic compressors of the type including a motor-compressor unit disposed within a hermetically sealed housing having an oil sump in the bottom thereof. More particularly, the invention relates to apparatus for minimizing turbulence within the housing during compressor operation, thereby reducing undesirable agitation of oil in the oil sump.

Hermetic compressors are used widely in refrigeration applications, due in part to the fact that having the compressor and drive mechanisms encased within a sealed housing helps prevent undesirable leakage of refrigerant from the system. Another important advantage of the hermetic compressor design is the ability to provide an oil sump in the bottom of the housing from which oil is drawn to lubricate bearings and the like in the compressor mechanism. In some hermetic scroll compressors, the oil from the sump is also used for achieving initial actuation of the compressor and subsequent axial compliance of the cooperating scroll members toward one another.

A common design for a hermetic compressor is to have the electric drive motor in the bottom portion of the housing, adjacent the oil sump, and the compressor mechanism in the top portion of the housing. In such an arrangement, the crankshaft of the compressor mechanism ordinarily is coaxially disposed within the motor rotor and operably engaged thereby. A lower end of the crankshaft extends into the oil sump so that oil can be pumped therefrom, through a passageway in the crankshaft, to the compressor mechanism. The lower axial end of the motor rotor adjacent the oil sump will typically include an axially protruding, arc-shaped weight adapted to counterbalance eccentric rotating masses associated with the compressor mechanism at the opposite end of the crankshaft.

A problem arises in the aforementioned hermetic compressor having a rotor equipped with a counterbalance weight adjacent the oil sump, in that the rotating rotor causes turbulence within the housing, which agitates the oil in the oil sump and results in lower quality oil for lubrication purposes. Specifically, turbulence may either displace the oil in the sump so as to cause an interruption of oil being supplied to the bearings, or aerate the oil to a foamy condition. In either case, failure to provide a constant supply of high quality oil may result in damage to the bearings or an inability of the compressor to function properly. The problem is exaggerated in compressors employing centrifugal rather than differential pressure pumping, because the oil flow rates are lower and interruptions in the supply of high quality oil take longer to correct themselves.

It is known in the prior art to weld a cup to the bottom of the housing, into which the oil pick-up tube on the end of the crankshaft extends. In this manner, oil must first enter a quiet zone within the cup prior to being drawn into the pick-up tube. However, this has proven only marginally successful in eliminating the adverse effects of turbulence. Another prior art device involves a horizontal separating plate that is welded to the housing intermediate the oil sump and the drive motor. The oil pick-up tube extends through a hole in the plate in order to access the oil. This method has several disadvantages, including added material and increased manufacturing costs, the need to weld to the housing, and an increased axial dimension of the housing to accommodate the plate.

While prior art attempts to ensure high quality, placid oil in the oil sump of a hermetic compressor have been somewhat successful, it is desired to provide an improved apparatus for minimizing the turbulence within the compressor housing that is attributable to the motor rotor and counterbalance weight.

SUMMARY OF THE INVENTION

The present invention overcomes the disadvantages of the above-described prior art hermetic compressors by providing an improved oil turbulence minimizing apparatus, wherein a counterbalance weight is provided on the end of a motor rotor adjacent the oil sump in order to prevent the creation of undesirable turbulence during compressor operation.

Generally, the invention provides a hermetic compressor comprising a housing having a compressor mechanism, drive mechanism, and oil sump encased therein. The drive mechanism includes a rotor having an axial end adjacent the oil pump, to which a counterbalance weight is connected. Despite the counterbalance weight, a substantially smooth surface is presented adjacent the oil sump by virtue of a substantially planar plate member being connected to the rotor axial end with the counterbalance weight disposed intermediate the plate member and the rotor axial end. Upon rotation of the rotor, the smooth surface does not create the turbulence ordinarily caused by the rotor and counterbalance weight assembly.

More specifically, the invention provides, in one form thereof, a hermetic compressor including a motor-compressor unit contained within a housing having an oil sump, wherein the motor includes a rotor having a lower axial end adjacent the oil sump. An annular counterbalance weight having eccentric mass is connected to the lower axial end of the rotor. The weight has a generally smooth annular lower surface facing the oil sump. In one aspect of the invention, the counterbalance weight is an assembly comprising a separate arc-shaped weight and annular plate member, wherein the plate member is connected to the rotor with the weight disposed therebetween. In another aspect of the invention, the weight and plate member are integrally formed. Specifically, an annular ring has a solid arc portion and a hollow arc portion.

An advantage of the oil turbulence minimizer of the present invention is that turbulence within the housing caused by the rotor and counterbalance weight assembly is substantially eliminated.

Another advantage of the oil turbulence minimizer of the present invention is that a high quality, placid oil supply is maintained in the oil sump for use in lubricating and operating the compressor.

Yet another advantage of the oil turbulence minimizer of the present invention is that the risk of damage to the compressor mechanism bearings and other parts receiving lubricating oil is greatly reduced.

A further advantage of the oil turbulence minimizer of the present invention is that a more reliable solution to reducing turbulence is provided requiring less material and manufacturing costs.

A still further advantage of the oil turbulence minimizer of the present invention, in one form thereof, is that it is combined with another functioning component of the compressor, i.e., the counterbalance weight, thereby simplifying the compressor design and gaining cost and manufacturing efficiencies.

Another advantage of the oil turbulence minimizer of the present invention is that no welding of component parts to the housing is required.

Yet another advantage of the oil turbulence minimizer of the present invention, in one form thereof, is that it may be easily incorporated in an existing compressor having a rotor and counterweight assembly.

A further advantage of the oil turbulence minimizer of the present invention is that the dimensions of the compressor need not be changed to accommodate the oil turbulence minimizer.

The present invention, in one form thereof, provides a hermetic compressor assembly including a housing in which are disposed an oil sump, a compressor mechanism for compressing refrigerant, and a drive mechanism. The compressor mechanism has a drive input, and the drive mechanism has a drive output operably coupled to the drive input. The drive mechanism includes a rotor that is rotatable about a generally vertical axis, wherein the rotor has an axial end facing the oil sump. A counterbalance weight and a substantially planar turbulence minimizing plate member are connected to the rotor axial end such that the counterbalance weight is intermediate the plate member and the rotor axial end. In one aspect of the invention, the weight and plate member are integrally formed. In another aspect of the invention, the plate member has a substantially smooth bottom surface of revolution about the vertical axis, which is either planar or dish-shaped, i.e., varying axially away from the oil sump at increasing radial distances from the vertical axis.

The present invention further provides, in one form thereof, a hermetic compressor assembly including a housing having an oil sump in the bottom thereof, and a motor-compressor unit disposed within the housing. The unit comprises an electric motor having a rotor, and a compressor having a crankshaft coaxially disposed within the rotor and drivingly engaged thereby. The crankshaft extends from a lower axial end of the rotor into the oil sump and draws oil from the oil sump for delivery through an oil passageway in the crankshaft to the compressor for lubrication thereof. A counterbalance weight is connected to the lower axial end of the rotor and includes an annular body member having eccentric mass with respect to the axis of rotation of the rotor. The body member includes a central opening through which the crankshaft extends. The body member also includes a generally smooth annular lower surface facing the oil sump, whereby the rotor and the counterbalance weight may operably rotate without creating turbulence and causing agitation of the oil in the oil sump. In one aspect of the invention according to this form, the counterbalance weight includes a solid first arc portion and a hollow second arc portion.

BRIEF DESCRIPTION OF THE DRAWINGS

FIG. 1 is a side sectional view of a hermetic compressor assembly of the type to which the present invention pertains;

FIG. 2 is an enlarged fragmentary sectional view of the bottom portion of the compressor of FIG. 1, particularly showing an oil turbulence minimizer in accordance with one embodiment of the present invention;

FIG. 3 is an enlarged top view of the oil turbulence minimizer of FIG. 2, particularly showing a solid arc portion and a hollow arc portion;

FIG. 6 is an enlarged transverse sectional view of the compressor of FIG. 5 taken along the line 6—6 in FIG. 5 and viewed in the direction of the arrows.

DESCRIPTION OF THE PREFERRED EMBODIMENT

Figure 4:
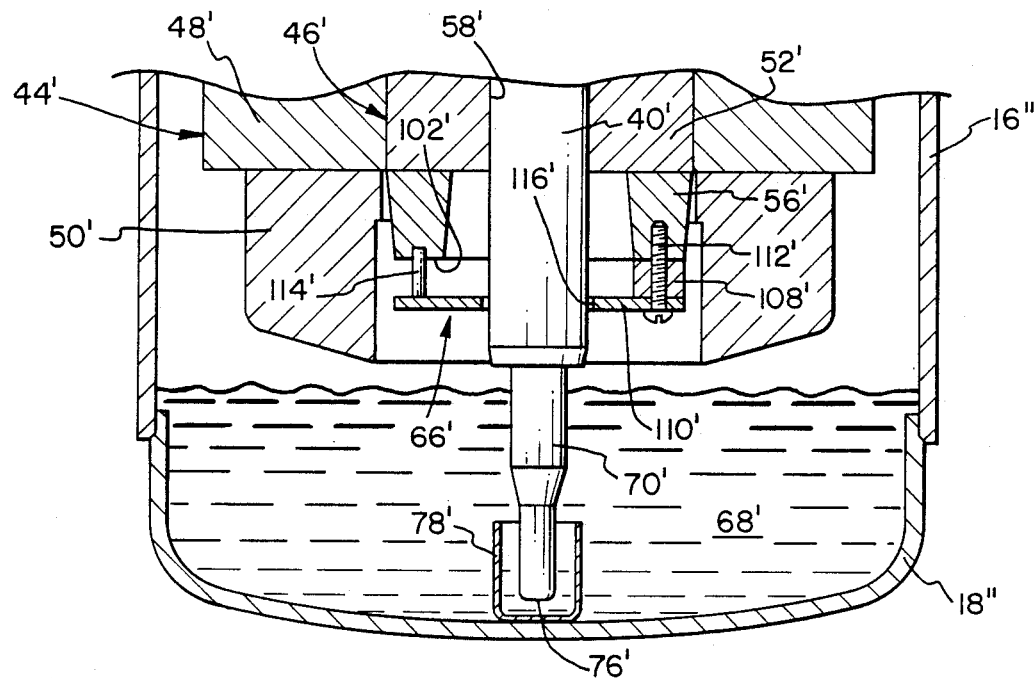
FIG. 4 is an enlarged fragmentary sectional view of the bottom portion of the compressor of FIG. 1, particularly showing an oil turbulence minimizer in accordance with another embodiment of the present invention.

Referring to FIG. 1, there is shown a hermetic scroll compressor 10 to which various embodiments of the present invention are applicable, as described hereinafter. Compressor 10 includes a housing 12 comprising a top cover plate 14, a central portion 16, and a bottom portion 18, wherein the three housing portions are hermetically joined, as by welding. Housing 12 includes a suction inlet 20, a discharge outlet 22, and an electrical terminal cluster 24. A mounting plate 26 is welded to bottom portion 18 for mounting the housing in a vertically upright position.

Disposed within housing 12 is a motor-compressor unit 28 comprising a scroll compressor mechanism 30 and an electric motor 32. Scroll compressor mechanism 30 includes a fixed scroll member 34, an orbiting scroll member 36, and a frame member 38. A crankshaft 40 is rotatably journalled in frame member 38, and is operably coupled to orbiting scroll member 36 to effect orbiting motion thereof relative to fixed scroll member 34, thereby causing compression of refrigerant. Accordingly, refrigerant entering suction inlet 20 is compressed and discharged into the housing interior prior to exiting through discharge outlet 22. A plurality of bolts 42 extend through frame member 38 and fixed scroll member 34 to mount compressor mechanism 30 to top cover plate 14.

Electric motor 32 includes a stator assembly 44 and a rotor assembly 46 that is rotatable about a generally vertical axis. Stator assembly 44 comprises a cylindrical core 48 and windings 50. Rotor assembly 46 comprises a laminate central portion 52 and cast upper and lower end rings 54 and 56, respectively. Central portion 52 has a central aperture 58 provided therein into which is coaxially secured crankshaft 40 by an interference fit. Accordingly, crankshaft 40 is drivingly engaged by rotor assembly 46, whereby motor 32 provides a drive mechanism for compressor mechanism 30.

Referring now to FIGS. 1 and 2, the upper end of crankshaft 40 includes an eccentric crankpin and roller assembly 60, which operably engages the underside of orbiting scroll member 36. Crankshaft 40 also includes a thrust plate 62, intermediate orbiting scroll member 36 and frame member 38, to which is attached a counterweight 64. In order to counterbalance the rotating masses associated with orbiting scroll member 36 and counterweight 64, it is desirable to provide at the lower end of the crankshaft a counterbalance weight, which typically comprises an arc-shaped weight attached to lower end ring 56 of rotor assembly 46. In accordance with the principles of the present invention, compressor 10 includes a counterbalance weight assembly 66 connected to lower end ring 56, which will be described in further detail with respect to three alternative embodiments shown in the drawings.

Housing 12 includes an oil sump 68 in the bottom thereof, from which oil is supplied to the compressor mechanism by means of an oil lubrication system, comprising an oil pick-up tube 70 and a vertical oil passageway 72 in crankshaft 40. More specifically, oil pick-up tube 70 is press fit into a counterbore 74 in the lower end of crankshaft 40, and functions upon rotation of crankshaft 40 to draw oil from sump 68 and pump the oil upwardly through passageway 72. Oil inlet end 76 of oil pick-up tube 70 extends into the top opening of an oil cup 78, which is welded to the bottom surface of housing bottom portion 18. As mentioned previously, oil cup 78 helps to some extent in improving the quality of oil being drawn from the sump.

In the embodiment of counterbalance weight assembly 66 shown in FIGS. 2 and 3, assembly 66 comprises an annular steel body member 80 having a solid arc portion 82 and a hollow arc portion 84. Consequently, a counterbalance weight having eccentric mass with respect to the vertical axis of rotation of rotor assembly 46 is provided. More importantly, body member 80 provides a smooth annular lower surface 86 facing oil sump 68, whereby upon rotation of rotor assembly 46 there is no axially protruding member that would cause turbulence and accompanying agitation of the oil in oil sump 68, as is the case with a typical arc-shaped counterbalance weight. Body member 80 is adjustably connected to rotor assembly 46 by means of a pair of screws 88 received through a respective pair of slots 90 in arc portion 82 and threadedly engaged in lower end ring 56. Preferably, the heads of screws 88 would be countersunk within slots 90 to maintain a completely smooth profile on lower surface 86.

Referring once again to body member 80 of FIGS. 2 and 3, hollow arc portion 84 is a U-shaped arc channel comprising a radially inner wall 92, a radially outer wall 94, a bottom wall 96, and a top opening 98 on a substantially planar annular top surface 100 of body member 80. When body member 80 is attached to lower end ring 56, annular top surface 100 abuts an annular lower surface 102 of lower end ring 56, thereby closing top opening 98. As shown in FIG. 2, a central opening 104 in body member 80 is spaced circumjacent crankshaft 40, thereby avoiding interference therebetween during assembly.

Figure 5:
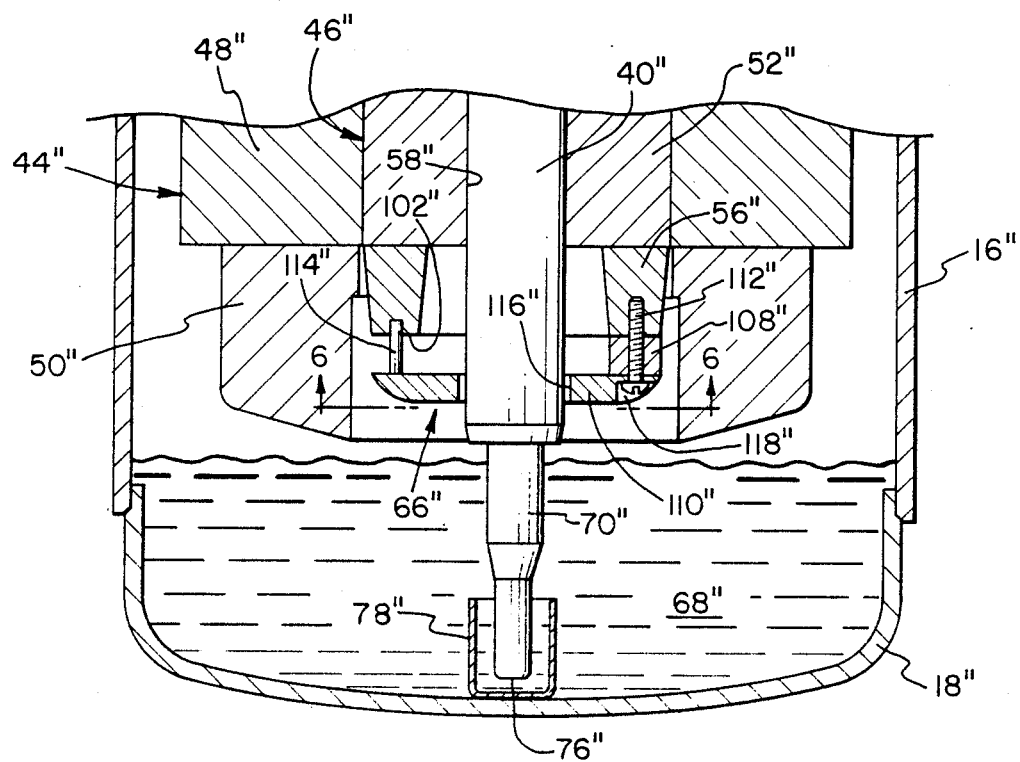
FIG. 5 is an enlarged fragmentary sectional view of the bottom portion of the compressor of FIG. 1, particularly showing an oil turbulence minimizer in accordance with a further embodiment of the present invention.

The alternative embodiments of counterbalance weight assembly 66 that are presented in FIGS. 4 and 5 are particularly applicable to a compressor wherein a separate arc-shaped counterbalance weight is attached to an arc portion of annular lower surface 102. With specific reference to FIG. 4, an arc-shaped counterbalance weight 108' is connected to lower end ring 56', whereby weight 108' is disposed intermediate end ring 56' and an annular plate member 110'. As illustrated, a first arc portion of plate member 110' coinciding with the arc length of counterbalance weight 108' is connected to end ring 56' with counterbalance weight 108' disposed therebetween, and a second remaining arc portion of plate member 110' is spaced from annular lower surface 102' by a distance equal to the axial dimension of counterbalance weight 108'.

More specifically, the first arc portion of plate member 110' and counterbalance weight 108' are attached to end ring 56' by means of a pair of screws 112'. The second arc portion is spaced from lower surface 102' by means of a spacer pin 112' press fit or otherwise suitably attached to each of plate member 110' and end ring 56'. Plate member 110' includes a central opening 116' spaced circumjacent crankshaft 40'.

Similar to the embodiment of FIG. 4, the embodiment of counterbalance weight assembly 66" shown in FIGS. 5 and 6 is particularly applicable to a separate arc-shaped counterbalance weight 108". The embodiment of FIGS. 5 and 6 is identical to the embodiment of FIG. 4, with the exception of annular plate member 110". As shown in FIG. 5, plate member 110" is dish-shaped, which exhibits additional benefits in minimizing the turbulence generating by rotating rotor assembly 46". As shown in FIG. 6, plate member 110" also includes counterbores 118" to receive the heads of respective screws 112". The remaining description of the embodiment of FIG. 4 is equally applicable to the embodiment of FIGS. 5 and 6.

It will be appreciated that each embodiment of the present invention provides a counterbalance weight assembly having a smooth bottom surface facing the oil sump. Whether or not planar, each bottom surface can be characterized as being a surface of revolution about the vertical axis of rotation of the rotor. In the dish-shaped plate member of FIGS. 5 and 6, the resulting bottom surface of revolution varies axially away from the oil sump at increasing radial distances from the central vertical axis. The provision of a smooth surface of revolution is essential in eliminating the turbulence caused by the rotating rotor assembly.

It will also be appreciated that each of the disclosed embodiments can be characterized as comprising a counterbalance weight and a substantially planar turbulence minimizing plate member, wherein the counterbalance weight is intermediate the plate member and the rotor axial end. This characterization is equally true in the case of an integrally formed counterbalance weight assembly.

It will be appreciated that the foregoing description of several embodiments of the invention is presented by way of illustration only and not by way of any limitation, and that various alternatives and modifications may be made to the illustrated embodiments without departing from the spirit and scope of the invention.

What is claimed is:

1. A hermetic compressor assembly, comprising:
    a housing;
    an oil sump within said housing;
    a compressor mechanism within said housing for compressing refrigerant, said compressor mechanism having a drive input;
    a drive mechanism within said housing having a drive output operably coupled to said drive input, said drive mechanism including a rotor rotatable about a generally vertical axis, said rotor having an axial end facing said oil sump;
    a counterbalance weight connected to said rotor axial end; and
    a substantially planar turbulence minimizing plate member connected to said rotor axial end, said counterbalance weight being intermediate said plate member and said rotor axial end.

2. The hermetic compressor assembly of claim 1 in which said counterbalance weight and said plate member are integrally formed.

3. The hermetic compressor assembly of claim 1 in which said plate member is a generally flat annular ring.

4. The hermetic compressor assembly of claim 1 in which said plate member includes a smooth bottom surface of revolution about said vertical axis.

5. The hermetic compressor assembly of claim 4 in which said bottom surface of revolution is planar.

6. The hermetic compressor assembly of claim 4 in which said bottom surface of revolution varies axially away from said oil sump at increasing radial distances from said vertical axis.

7. The hermetic compressor assembly of claim 1 in which:
said counterbalance weight is arc-shaped having an axial dimension; and
a first arc portion of said plate member is connected to said rotor axial end with said arc-shaped counterbalance weight disposed therebetween, and a second arc portion of said plate member is spaced from said rotor axial end a distance equal to said counterbalance weight axial dimension.

8. The hermetic compressor assembly of claim 7 in which said second arc portion is spaced from said rotor axial end by means of a spacer attached to each of said plate member and said rotor.

9. The hermetic compressor assembly of claim 1 in which said drive mechanism includes a crankshaft rotatable about said vertical axis, and said plate member is annular and is circumjacent said crankshaft in spaced relationship thereto.

10. The hermetic compressor assembly of claim 1 in which:
said drive input of said compressor mechanism comprises a crankshaft that is coaxially disposed within said rotor and drivingly engaged thereby, said crankshaft extending from said rotor axial end into said oil sump and including means for drawing oil from said oil sump for delivery through an oil passageway in said crankshaft to said compressor mechanism for lubrication thereof; and
said turbulence minimizing plate member includes a central opening through which said crankshaft extends.

11. The hermetic compressor assembly of claim 10 in which said plate member is spaced circumjacent said crankshaft.

12. The hermetic compressor assembly of claim 1 in which:
said counterbalance weight covers an arc portion of said rotor axial end and extends axially toward said oil sump; and
said plate member includes a smooth bottom surface of revolution about said vertical axis, whereby said plate member prevents turbulence and resulting agitation of the oil in said oil sump ordinarily caused by rotation of said rotor and said counterbalance weight extending axially from said annular bottom surface.

13. A hermetic compressor assembly, comprising:
a housing;
an oil sump within said housing;
a motor-compressor unit disposed within said housing, said unit comprising an electric motor having a rotor, and a compressor having a crankshaft coaxially disposed within said rotor and drivingly engaged thereby, said crankshaft extending from a lower axial end of said rotor into said oil sump and including means for drawing oil from said oil sump for delivery through an oil passageway in said crankshaft to said compressor for lubrication thereof; and
a counterbalance weight connected to said lower axial end of said rotor, comprising an annular body member having eccentric mass with respect to the axis of rotation of said rotor, said body member including a central opening through which said crankshaft extends and a generally smooth annular lower surface facing said oil sump, whereby said rotor and said counterbalance weight may operably rotate without creating turbulence and causing agitation of the oil in said oil sump.

14. The hermetic compressor assembly of claim 13 in which said annular lower surface comprises a surface of revolution about said axis of rotation.

15. The hermetic compressor assembly of claim 13 in which said counterbalance weight includes a first arc portion and a second arc portion, said first arc portion having greater mass than said second arc portion.

16. The hermetic compressor assembly of claim 15 in which said first arc portion is solid material and said second arc portion is hollow material, said second arc portion comprising a U-shaped channel having a top opening axially opposite said lower surface.

17. A hermetic compressor assembly, comprising:
a vertically upstanding housing;
an oil sump in the bottom of said housing;
a compressor mechanism within said housing for compressing refrigerant, said compressor mechanism including a vertically oriented crankshaft;
an electric motor including a rotor rotatable about a vertical axis of rotation, said crankshaft being coaxially received within said rotor and drivingly engaged thereby, said rotor including a lower axial end adjacent said oil sump and having an annular bottom surface facing said oil sump;
a counterbalance weight mounted to said lower axial end and covering an arc portion of said annular bottom surface, said counterbalance weight extending axially toward said oil sump; and
an annular body member connected to said rotor lower axial end, said body member including a smooth bottom surface of revolution about said vertical axis of rotation, said bottom surface being disposed intermediate said counterbalance weight and said oil sump, whereby said body member prevents turbulence and resulting agitation of the oil in said oil sump ordinarily caused by rotation of said rotor and said counterbalance weight extending axially from said annular bottom surface.

18. The hermetic compressor assembly of claim 17 in which said bottom surface of revolution is planar.

19. The hermetic compressor assembly of claim 17 in which said bottom surface of revolution varies axially away from said oil sump at increasing radial distances from said vertical axis.

20. The hermetic compressor assembly of claim 17 in which:
said counterbalance weight is arc-shaped having an axial dimension; and
a first arc portion of said body member is connected to said lower axial end with said arc-shaped counterbalance weight disposed therebetween, and a second arc portion of said body member is spaced from said lower axial end a distance equal to said counterbalance weight axial dimension.

* * * * *